United States Patent [19]

Davis

[11] 3,805,436
[45] Apr. 23, 1974

[54] FISH LURE

[75] Inventor: Jack E. Davis, Crescent City, Fla.

[73] Assignee: Victor Comptometer Corporation, Chicago, Ill.

[22] Filed: May 1, 1972

[21] Appl. No.: 248,947

Related U.S. Application Data

[63] Continuation-in-part of Ser. No. 109,148, Jan. 25, 1971, abandoned.

[52] U.S. Cl.............. 43/42.35, 43/42.39, 43/42.42
[51] Int. Cl............................................ A01k 85/00
[58] Field of Search............ 43/42.35, 42.39, 42.42

[56] References Cited
UNITED STATES PATENTS

| 2,184,031 | 12/1939 | Wyatt | 43/42.39 |
| 2,644,265 | 7/1953 | Stettner | 43/42.35 X |
| 2,752,721 | 7/1956 | Denny | 43/42.35 X |
| 2,940,206 | 6/1960 | Agnew | 43/42.35 |
| 2,598,771 | 6/1952 | Eder | 43/42.35 |
| 2,641,081 | 6/1953 | Moore | 43/42.42 |

Primary Examiner—Russell R. Kinsey
Assistant Examiner—Daniel J. Leach
Attorney, Agent, or Firm—Bruce G. Klaas

[57] ABSTRACT

A fishing lure operable with a nose portion located at a different level than a tail portion and having action inducing means comprising a pulling force application point located above and behind the front end of the lure with first action inducing means located in front of the point to cause a first lure turning movement to one side or the other and reaction surface means on the tail portion which counteracts the first turning movement and causes a second turning movement in the opposite direction.

24 Claims, 19 Drawing Figures

FISH LURE

This is a continuation-in-part application of my prior copending application Ser. No. 109,148, filed Jan. 25, 1971, now abandoned, and related to my copending design application Ser. No. 249,483, filed May 1, 1972, and my design patent No. 228,384, issued Sept. 18, 1973.

BACKGROUND AND SUMMARY OF THE INVENTION

The present invention relates to fishing lures and, more particularly to a fishing lure, adapted to be attached to a fishing line and pulled through water by a reel as in casting or by a boat as in trolling, with integral action inducing means operable as the lure is pulled through the water to cause the lure to swing rapidly from side to side of the line of pull to attract fish by the movement (action) of the lure.

Among the various features and advantages of the present invention are a distinctive action, a controlled uniform repetitive action which is self-induced and self-sustaining during movement through water, an action which may be varied in accordance with the speed at which the lure is pulled through water, and an action which gives a lifelike appearance.

There are two general types of illustrative lure embodiments disclosed herein. The inventive concepts common to both illustrative embodiments comprise a generally symmetrical elongated fish or eel-like appearing body member having a smooth tapered surfaced nose portion, a tail portion, and an intermediate body portion which is curved so as to locate the tail portion above the head portion in the fishing position in water. A pivotal type fishing line attachment means is provided on the upper front surface of the lure and spaced rearwardly of the front end of the lure so that, as the lure rests in or is pulled through the water, at least the forwardmost part of the nose portion is located forwardly of and below the point of attachment of the line to the lure whereby a pivotal swinging movement of the lure, about the point of connection of the fishing line to the line attachment means, is induced by water pressure acting on the nose portion.

While the prior art, such as U. S. Pat. Nos. 1,745,006 of Chapleau, 2,423,717 of Mikina, and 2,536,553 of LaFleur, generally discloses some of the aforedescribed lure characteristics, the present invention includes the following additional features. The lure body has weight and flotation means, which, along with the curvature of the intermediate body portion, causes the lure to rest in or be pulled through the water with the tail portion at a higher elevation than the nose portion. In order to induce a repetitive controlled side to side lure action, a generally flat forward facing reaction surface, which extends in a plane or planes transverse to a vertical plane including the longitudinal axis of the lure, is provided on the tail portion to be engaged by water flowing around and past the body portion of the lure whereby the lure will be oppositely turned and returned from the direction of pivotal swinging movement, induced through the nose portion, by water pressure acting on the reaction surface of the tail portion. In order to facilitate the flow of water around the body portion and onto the reaction surface on the tail portion, the tail portion is connected to the body portion by a waist-like section having a narrower width than the tail portion or the body portion. The flow of water is also facilitated by the curvature of the body portion which defines a flow channel between the head portion and the tail portion.

The aforementioned inventive concepts and additional inventive concepts have been illustratively embodied in one form of fishing lure generally known as a surface bait casting type lure which is intended to float on the surface of the water when at rest in the water. If the lure is pulled slowly through the water, it will move along or closely adjacent the water surface. If the lure is pulled rapidly, it will run beneath the surface of the water. The lure has the smooth streamline appearance of a fish and a generally arcuate overall configuration with a downwardly facing concave side surface and an upwardly facing convex side surface in the fishing position. Hook means are attached along the downwardly facing concave side surface and the lure is constructed so that it will float in the water with the hooks and the concave surface facing downwardly so that the lure simulates a dead, wounded or otherwise injured fish. In addition to the aforedescribed action of the lure when it is being pulled through the water, it may have either a slight rearward and upward movement or a slight forward and upward movement as it floats to a rest position on the surface from beneath the surface when the tension on the associated fishing line is relieved.

The aforementioned inventive concepts and additional inventive concepts also have been embodied in another form of fishing lure generally known as an underwater or bottom type casting lure which is intended to float beneath the surface or on the bottom when at rest in the water. The lure has an action and an appearance in the water which closely simulates a feeding fish or eel at various levels in the water. The lure has a nose down position in the water caused by weighting the head portion relative to the tail portion. In one presently preferred embodiment, the lure is constantly maintained in the nose down position by internal flotation means behind the head portion to keep the other portions of the lure at a higher level than the head portion, while in another alternative embodiment the lure has no flotation means and is in the nose down position only when being pulled through water. In the flotation embodiment, the weight may be varied to cause the lure to float at any chosen level such as adjacent the water surface, the bottom, or anywhere in between. The position of the lure in the water and the action of the lure cause it to be somewhat self-disentangling by placement of the hooks in a relatively protected area located behind and above the head portion of the lure. The flotation lure is particularly well suited for use as a bottom lure, particularly when provided with an anti-snag guide member located on the nose portion and extending forwardly and downwardly therefrom to space the lure from the bottom and guide it over obstacles. The action of the flotation lure is such that a fisherman can "walk" the lure on the bottom over logs or other irregularities and into and out of holes with the lure always in a generally downwardly facing bottom feeding position with the body of the lure completely exposed for a strike by a fish.

DETAILED DESCRIPTION OF THE EMBODIMENT OF FIGS. 1—8

Figure 1:
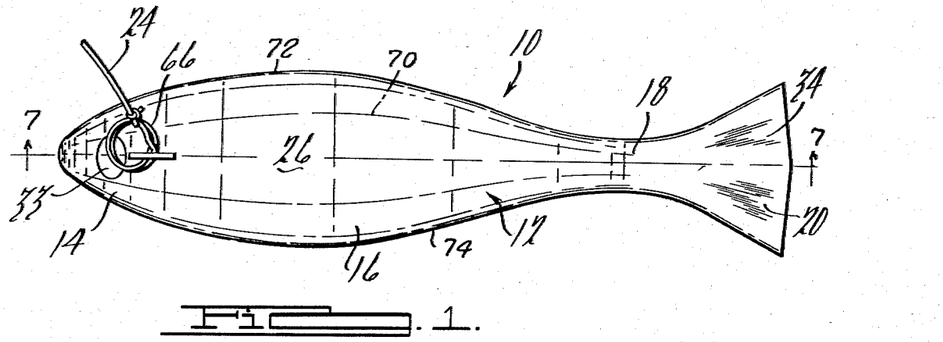
FIG. 1 is a longitudinal top plan view of one form of artificial fishing lure embodying the principles of the present invention shown in a non-fishing position with the fishing line extending laterally of the lure body for purposes of illustration rather than longitudinally as in a fishing position.
Figures 7, 8:
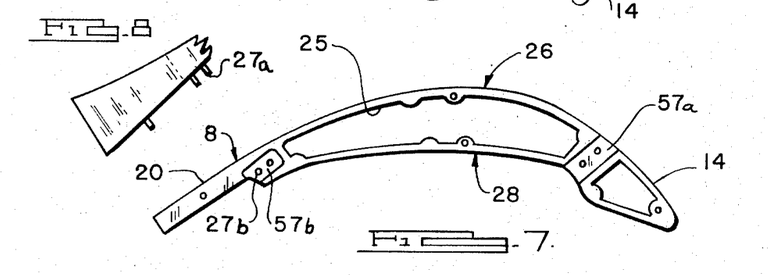
FIG. 7 is a cross-sectional view taken along the line 7—7, in FIG. 1.
FIG. 8 is a partial top view of the tail portion of the lure taken in the direction of arrow 8 in FIG. 7.

Referring now in detail to the drawing, a fishing lure 10, in accordance with an exemplary embodiment of the present invention, is shown as comprising an elongated, generally arcuate or half moon, generally symmetrical shaped fish appearing or simulating body member 12 having a forward or head portion 14 at one end thereof, a central or intermediate portion 16 having a reduced thickness waist-like section 18 at the end thereof opposite the head portion 14, and a rearward or tail portion 20 at the end of the body 12 opposite the head portion 14. The lure 10 is provided with a pair of treble hook assemblies 22 that may be of any suitable construction and which are adapted to be attached to the bottom (as seen in the general fishing position of FIG. 2) of the lure body 12 in a manner later to be described adjacent the head and tail portions 14 and 20, respectively, thereof. The lure 10 is adapted to be used in conjunction with a conventional fishing line, a portion of which is illustrated in the drawing and designated by the numeral 24, the line 24 being operative in a conventional manner to connect the lure 10 to an associated fishing rod and reel (not shown) used for casting and retrieving the lure 10, as is well known in the art. The lure body 12 is constructed so that it will float on the surface of the water as shown in FIG. 5, this being accomplished, for example, by providing a hollow water tight cavity 25 interiorly of the body 12 as shown in FIG. 7, or alternatively, by constructing the body of a closed cellular material, or wood or the like, as is well known in the art. In the presently preferred form the lure body is made from two half pieces of molded plastic material, as shown in FIG. 7, which are sealingly connected by mating pins and holes 27a, 27b and by a suitable adhesive.

The lure body 12 is defined in part by a pair of longitudinally extending arcuate shaped side surfaces 26 and 28, the former of which is of a generally convex configuration and includes an intermediate arcuate shaped surface section 30 which lies along the upper (as viewed in the general fishing position of FIG. 2) side of the intermediate body portion 16, and which blends smoothly into a relatively flat or planar reaction surface section 32 that lies along the head portion 14 of the body 12. As may be seen in FIGS. 1 and 2, the lure body has a relatively narrow vertical width and a relatively wide horizontal width so as to be generally horizontally elongated or flat in cross section in the general fishing position of FIG. 2. The surface section 32 is provided with suitable indicia delineating an artificial fishing eye 33, as best seen in FIG. 1. The arcuate surface section 30 also blends smoothly into a generally horizontally elongated relatively flat or planar reaction surface section 34 which lies alongside the tail portion 20 and waist section 18 of the lure body 12, as best seen in FIG. 2.

The lower (as viewed in the general fishing position of FIG. 2) side surface 28 of the lure body 12 is of a generally concave configuration and comprises an intermediate surface section 36 which is arranged on the opposite side of the body portion 16 from the surface section 30. The section 36 is of a generally arcuate configuration defined by a somewhat larger radius than the convex side section 26 so as to be flattened relative thereto. The rearward end of the intermediate surface section 36 terminates at an inwardly projecting shoulder 38 which is aligned longitudinally with the waist portion 18 of the lure body 12 and defines with the tail portion 20 thereof, a generally laterally inwardly offset, generally horizontally elongated, relatively flat or planar reaction surface section 40 which lies along the opposite side of the tail portion 20 from the surface section 34 and may be defined by a pair of upwardly and downwardly slightly tapered or inclined intersecting surfaces 42 and 44, as best seen in FIGS. 2 and 3. In the fishing position, the surface sections 34, 40 may be seen to lie generally in a plane which is transverse to a vertical plane including the central longitudinal axis of the lure. The forward end of the arcuate intermediate surface section 36 terminates at a laterally outwardly inclined face or surface 46 which is located approximately adjacent the location of and approximates the gills of an actual fish, the face 46 defining with the surface section 36 a generally recessed area 28 or flow channel which is adapted to function in a manner hereinafter to be described in controlling the action of the fishing lure 10 of the present invention as it is being pulled or retrieved through the water upon proper tensioning or reeling of the fishing line 24 and which provides space for attachment of the front hook means 22 while limiting forward movement thereof. The forward end of the inclined face 46 terminates at a forwardly converging surface section 50 which lies along the opposite side of the head portion 14 of the lure body 12 from the surface section 32, as best seen in FIG. 2, the surface section 50 being provided with suitable indicia delineating a second fish eye 52 corresponding to the aforementioned eye 33.

The fishing lure body 12 is intended to have the appearance of an actual fish, and as such, may be painted or otherwise decorated, for example, so as to have a relatively light colored underside (in relation to the fish form) and have other means or indicia depicting scales or other characteristic features which will render the lure 10 appealing to the particular type of fish with which the lure 10 is to be associated, as will be apparent to those skilled in the art.

Figure 2:
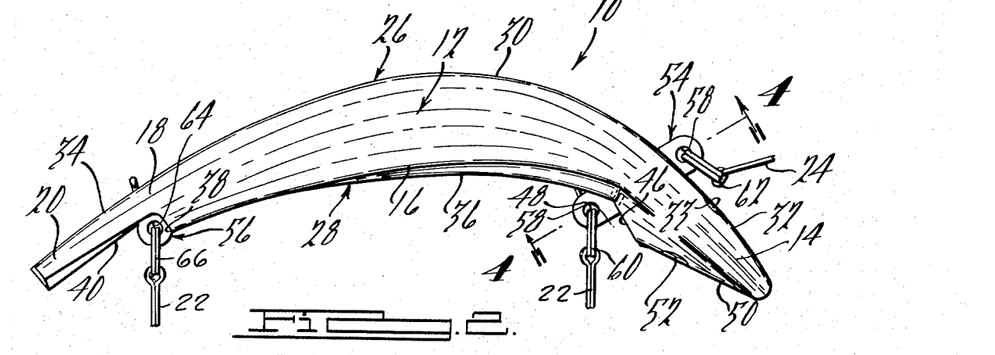
FIG. 2 is a side elevational view of the lure of FIG. 1.
Figure 3:
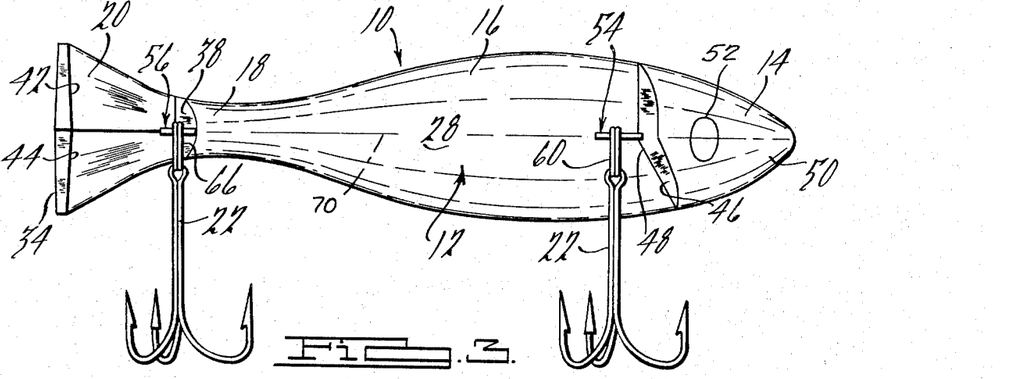
FIG. 3 is a longitudinal bottom plan view of the lure of FIG. 1 taken in the opposite direction with the fishhook members extending laterally of the lure body for purposes of illustration, rather than vertically as in the normal fishing position.
Figure 4:
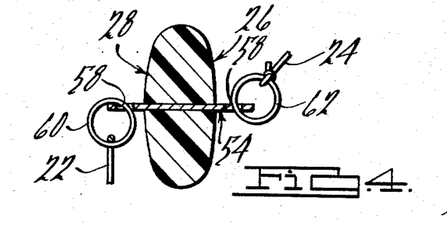
FIG. 4 is a cross-sectional view taken along the line 4—4 in FIG. 2.

The fishing lure 10 is provided with a pair of securing elements 54 and 56 which may be and preferably are fabricated of metal and are of a generally thin, flat, uniform thickness configuration, as best seen in FIGS. 2 and 3. In general, the securing elements 54, 56 are adapted to be embedded or otherwise fixedly secured interiorly of the lure body 12 at positions 57a, 57b, FIG. 7, adjacent the head and tail sections 14 and 20 thereof. More particularly, the element 54 is oriented such that an intermediate portion thereof is embedded within an intermediate portion 57a of the lure body 12, with the opposite ends thereof extending laterally outwardly from the opposite sides of the lure body 12. The laterally outer ends of the element 54 are formed with a pair of apertures 58 through which a pair of suitable fastening rings 60 and 62 extend, the ring 60 functioning to pivotally movably secure the forward hook assembly 22 to the element 54, and the ring 62 functioning to pivotally movably secure one end of the fishing line 24 to the element 54 at a point 63 (FIGS. 5–6) located toward the rear of the head portion 14 so that at least parts of the head portion are located forwardly and downwardly of the point 63 when the lure is in a fishing position in water. In a similar manner, the securing element 56 is adapted to have one end thereof embedded or otherwise secured interiorly of the lure body 12 at a position generally longitudinally aligned with the waist section 18. The opposite end of the securing element 56 projects laterally outwardly from the lure body 12 at a position adjacent the shoulder 38 which serves to limit forward movement of the hook assembly to prevent entanglement or release and is formed with an aperture 64 through which a suitable fastening ring 66 passes for pivotally securing the rearward hook means 22 to the element 56, as illustrated.

Figure 5:
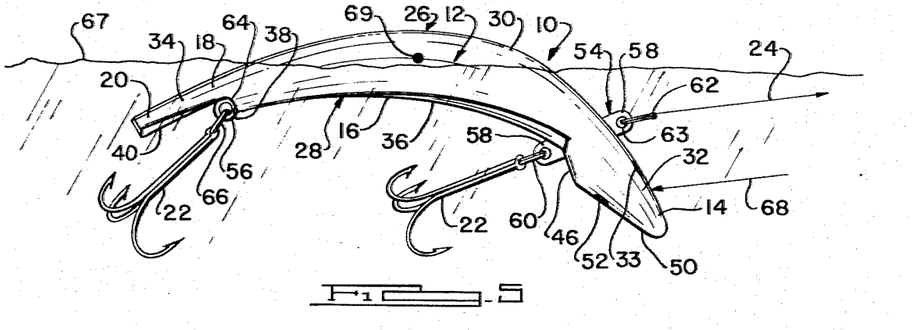
FIG. 5 is a side elevational view of the lure of FIG. 1 shown in a surface fishing position.
Figure 6:
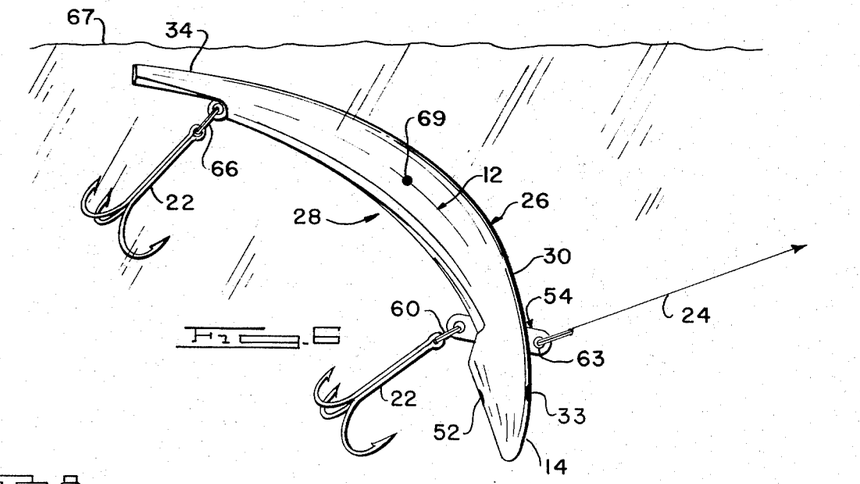
FIG. 6 is a side elevational view of the lure of FIG. 1 shown in an underwater fishing position.

In use of the fishing lure 10 of the present invention, the specific configuration of the side surfaces 26 and 28 have been found to impart unique action to the lure 10 when it is retrieved or pulled toward a fisherman as a result of tensioning of the fishing lure 24. The action of the lure is variable depending on how it is "played" by the fisherman. The lure may be used as a surface lure, as shown in FIG. 5, by slow retrieval on a continuous or intermittent basis. The lure may also be used as an underwater lure, as shown in FIG. 6, by fast retrieval causing the lure to dive from the position of FIG. 5 to the position of FIG. 6 wherein the water surface is represented by the line 67. When the lure is placed in the water it will assume a rest position similar to that shown in FIG. 5 with the head portion 14 and tail portion 20 immersed in the water with the head portion lower than the tail portion and with the lower part of the body portion 12 below the water and the upper part above the water. The lure will assume the position of FIG. 5 due to the curvature, the flotation, and the weight distribution of the lure body as well as the weight of the hooks 22. When the lure is slowly pulled through the water by force applied at 63 in the general direction of the line 24, water pressure acting on the reaction surface 32 in the general direction of the arrow 68 will force the head portion 14 downwardly and cause a generally pivotal turning and/or tilting movement of the lure about the point 63 to one side or the other of a vertical plane including line 24. Due to the flotation and water pressure acting on upper side surfaces 30, 32, the entire lure body will tend to move downwardly with the tail portion also tending to move upwardly relative to the nose portion by more or less pivotal movement about a center of flotation 69 (by which I mean a point in the plane of the water surface located centrally of the lure body midway between the front and rear water-lure intersection lines in the surface rest position of FIG. 5) located slightly rearwardly of the geometric center of the lure in the presently preferred embodiment. When the pulling force is reduced, the head portion will tend to pivot upwardly about the center of flotation 69 with the tail portion moving downwardly. When the pulling force is terminated and the line permitted to become slack, it has been found that a wooden lure (not shown) having a center of flotation located forwardly of the geometric center appears to float upwardly and rearwardly and may actually surface rearwardly of the point at which its forward movement terminated. On the other hand, a plastic lure of the type shown in FIGS. 5–6 with the center of flotation 69 located rearwardly of the geometric center appears to float upwardly and forwardly when the fishing line is slackened. While the exact reasons for the aforedescribed movements are not known, the rearward or forward movement upon flotation to the surface from the fishing position to the rest position may be observed by holding a lure under water in the fishing position and releasing the lure to allow it to float to the surface. The resultant force appears to have the effect of moving the lure 10 slightly rearwardly or forwardly at such time as the tension on the line 24 is relieved. Thus, when the fishing line 24 is tensioned, the lure 10 will move forwardly until the tension on the line 24 is relieved at which time the lure 10 may move slightly rearwardly or forwardly as it floats to the surface. Consequently, when intermittent pulling forces are exerted against a lure having a forwardly located center of flotation by the fishing line 24, the lure will move forwardly when the line 24 is tensioned and may move slightly rearwardly at the intermittent intervals when the tension force on the line 24 is relieved and the lure rises in the water. Such action of the lure 10 has been found to be extremely effective in attracting fish to the lure 10 and has the advantage of increasing the time of play of the lure on any one retrieve since the lure tends to return toward its original position during short slow intermittent retrieval.

In addition to the above-described action of the lure, the lure has a repetitive controlled uniform side to side tilting and turning action during retrieval which simulates a swimming or thrashing wounded or injured fish. The tilting portion of the action appears to be initiated in one side direction or the other by water pressure acting unevenly on surface 32 relative to the central longitudinal line axis 70, FIGS. 1 and 3, so that the lure body tends to turn and/or tilt or roll onto one side surface 72 or the other side surface 74. At the same time, the lure body swings about the point 63 with the head portion 14 moving to one side of a vertical plane including the line of pull 24 and the tail portion 20 moving to the other side of such a plane. Eventually the turning or tilting action is counteracted by water pressure acting on either tail portion reaction surface 40 or tail portion reaction surface 34 depending upon the rate of movement (speed) of the lure relative to the water and the attitude of the tail portion of the lure in the water which is related to speed as hereinbefore discussed. The water flows over the body portion of the lure, across the flow channel under surface 36 between the head portion and the tail portion and around the reduced width waist portion 18 onto whichever of the reaction surfaces 34, 40 is forwardly facing, depending upon lure attitude, whereupon a counter force is exerted on the tail portion to cause a reverse opposite movement of the lure body whereby the head portion and tail portion will be returned to the central position and beyond at which point water pressure acting on nose surface 32 will continue the reverse opposite movement until counteracted by water pressure again acting on one of the reaction surfaces 34, 40. In this manner, the lure has a repetitive controlled uniform side to side motion as it is moved through the water. In addition to the above action of the lure 10, the particular configuration of the body 12 thereof, together with the location of the hook means 22 at the opposite ends thereof, results in the lure body 12 having a tendency to roll over in the water from the position shown in FIG. 1 toward the position shown in FIG. 2 so as to always assume the fishing position after being placed in the water. In the orientation shown in FIG. 2, the lure body 12 resembles an injured or wounded fish lying on its side which has an extremely beneficial fish attracting effect on certain types of fish, with the result that both the action and appearance of the lure 10 of the present invention will result in large catches of fish.

While the exact movements and reasons for the movement may not be completely understood, it is known that a lure constructed as hereinbefore described does produce a unique action. It appears that general principles involved are (1) a generally symmetrical fish like appearance including a head portion, a curved intermediate body portion, and a tail portion connected to the body portion by a reduced waist portion, (2) weighting and/or flotation means to position the lure in a head down-tail up position in the water, (3) locating the tail portion in offset relationship to the body portion and the head portion, (4) locating the line of pull above and behind the front end of the lure so that at least part of the head portion is located forwardly and downwardly of the point of application of the pulling force, (5) providing forward reaction surface means on the head portion located in front of the point of application of the pulling force to cause the lure to swing about the point of application of the line pull by water pressure acting thereagainst, and (6) providing rear reaction surface means on the tail portion lying in a forwardly facing transverse plane to counteract the movement induced by water pressure acting on the forward reaction surface means by water pressure acting thereagainst.

As will be apparent by reference to the following detailed description of alternative embodiments of the invention, shown in FIGS. 9-19, the general principles may be otherwise applied to fishing lures of varying construction.

DETAILED DESCRIPTION OF THE EMBODIMENTS OF FIGS. 9-19

Referring now to FIGS. 9-16, a flotation type lure is shown to comprise a generally symmetrical elongated hollow plastic body member 110, hook attachment means in the form of eyelets 114, 116 fastened to middle bottom portions of the body member, a pair of hook means 118, 120 attached to the eyelets, guide and support means 122 fastened to the front bottom portion of the body member, and line attachment means in the form of an eyelet 124 fastened to a front middle top portion of the body member.

In the presently preferred form, the body member 110 is constructed from two substantially identical half pieces (FIG. 12) molded from a suitable plastic material such as hard butyrate and then permanently fastened together by a suitable adhesive. In general, the body member comprises a head portion 126, a central body portion 128, and a tail portion 130. The body member has a generally fish-like or eel-like overall configuration and a somewhat tilted S-shaped configuration in side elevation in the fishing position, FIG. 12. The lure may be suitably decorated to provide a generally fish-like or eel-like appearance. The body member is generally symmetrically shaped about a central longitudinal axis 131, FIG. 11, with the various portions of the body member being generally symmetrically shaped about three separate coplanar intersecting longitudinal axes 132, 134, 136, FIG. 10. The head portion and the central body portion have a generally vertically elongated rectangular or oval cross-sectional configuration, FIGS. 9, 11 and 13, while the tail portion has a generally flat horizontally elongated cross-sectional configuration, FIG. 14.

Figures 12, 17:
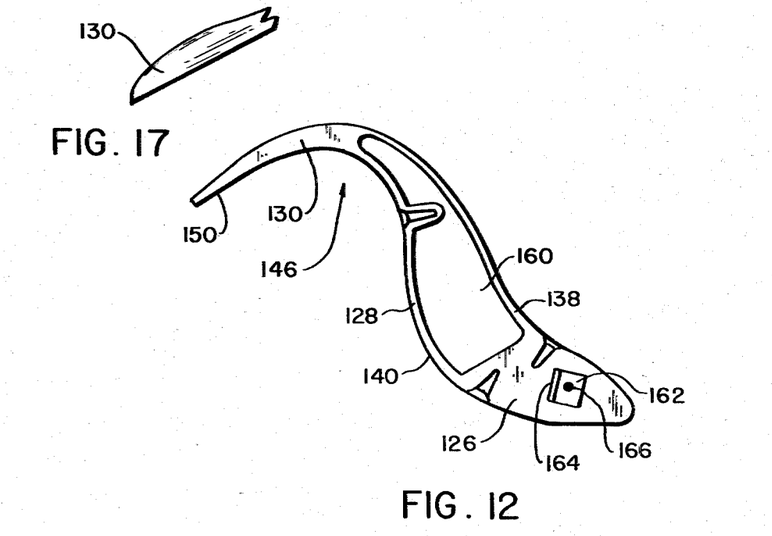
FIG. 12 is a cross-sectional view taken along the line 4—4 of FIG. 10 and showing the lure in fishing position.
FIGS. 17 and 18 are partial top views of other alternative tail portion configurations as viewed in FIG. 12.
Figure 13:
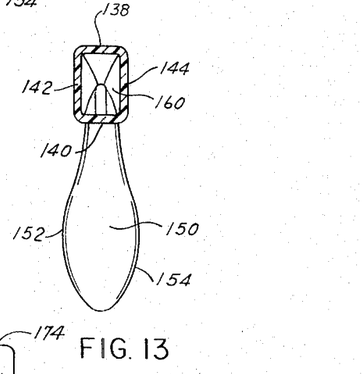
FIG. 13 is a cross-sectional view taken along the line 13—13 in FIG. 10.
Figure 14:
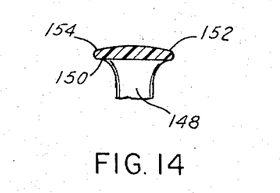
FIG. 14 is a cross-sectional view taken along the line 14—14 in FIG. 10.
Figure 15:
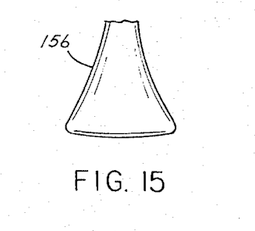
FIG. 15 is a partial top view of an alternative tail portion configuration of a lure embodying the inventive concepts.

In the presently preferred embodiment, the top, bottom and side surfaces 138, 140, 142, 144 of the head and central body portions are generally flat as seen in FIG. 13. As seen in FIG. 12, the body portion is curved generally upwardly and rearwardly while the tail portion is curved generally downwardly and rearwardly to provide a flow channel 146 therebetween to facilitate flow of water around the body portion and onto the tail portion for a purpose to be hereinafter described. The tail portion and the central body portion are connected by a relatively narrow inwardly tapered waist-like section 148 which further facilitates the flow of water around the body portion and onto the tail portion and also will tend to direct water flowing along the sides of the lure slightly inwardly toward the tail portion. The exterior surfaces of the lure are generally tapered or rounded to cause a more or less streamlined flow of water around the lure as it is pulled through water. As seen in FIG. 14, the bottom of the tail portion has a generally horizontally elongated flat widened flange-like area providing a reaction surface means 150 which faces downwardly and slightly forwardly in the fishing position of FIGS. 9 and 12. The reaction surface lies generally within a plane extending transversely to a vertical plane including longitudinal axes 132, 134, 136. Opposite sides 152, 154 of the tail portion extend transversely beyond the side surfaces 142 and 144 of the body portion so as to locate portions of the reaction surface 150 outwardly beyond the side surfaces 142, 144. It appears that the reaction surface may have several peripheral configurations, such as illustrated by the beaver-like tail of the embodiment of FIGS. 9-14, or the generally triangularly shaped alternative embodiments 156, 157 of FIGS. 15 and 18 or the generally rectangularly shaped alternative embodiment 158 of FIG. 16.

Figures 9, 10:
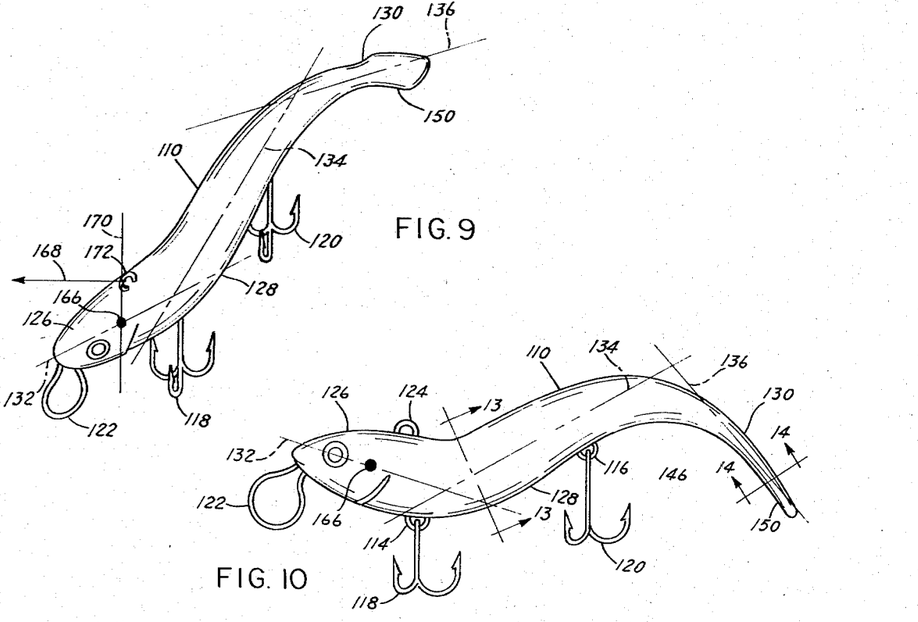
FIG. 9 is a perspective view of another form of flotation lure embodying the inventive concepts shown generally in fishing position.
FIG. 10 is a side elevational view of the lure of FIG. 9 in a non-fishing position.
Figure 11:
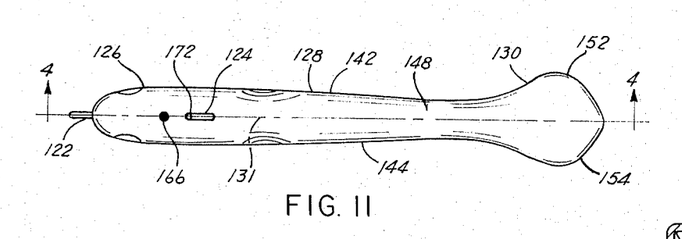
FIG. 11 is a top view of the lure of FIG. 10.

Referring now to FIGS. 12 and 13, flotation means in the form of an air tight flotation cavity 160, containing trapped air, is provided in the body portion 128 between the head portion 126 and the tail portion 130. Weight means in the form of a piece of lead or the like 162 is fixed or loosely mounted in an enlarged cavity 164 in the head portion to cause the center of gravity 166 of the lure to be located in the head portion and to cause the head portion to be located at a lower elevation than the tail portion when the lure is floating in the water as illustrated in FIGS. 9 and 12. The amount of the lead may be varied to provide a lure which will float at or near the surface, or a lure which will float at a predetermined distance below the surface, or a lure which will float at or near the bottom. Thus, in the fishing position of FIGS. 9 and 12, the head portion is at the lowest level and the central body portion extends upwardly and rearwardly to the tail portion which is located at the higher level. The line attaching eyelet 124 is centrally fastened to the top of the head portion of the lure so that the line of pull, indicated by the arrow 168, will be vertically upwardly offset relative to the center of gravity of the lure, indicated generally at 166. While the longitudinal or horizontal location of the line attachment eyelet relative to the center of gravity may be varied to obtain more or less lure action, in the presently preferred embodiment, the line attaching eyelet is located rearwardly of the center of gravity of the lure as measured along the longitudinal axis 132 of the head portion in FIG. 10. The arrangement is such that in water, FIGS. 9 and 12, the center of gravity and most of the head portion will be located below the line of pull 168 and a vertical line 170, drawn through the center of gravity and the point of application of the line of pull to the lure at pivot point 172, will be more or less at right angles to the line of pull and coincident with the action axis of the lure as will be more fully explained hereinafter.

The guide element 122, which is provided primarily for a bottom operating lure, is in the form of a relatively narrow width loop or wire which extends forwardly and downwardly of the head portion and acts as a runner or skid. Thus, as the lure is pulled along the bottom, FIG. 19, the guide element will contact any obstruction in front of or below the lure and have substantially line contact therewith so as to be easily moved without interfering with the action of the lure. Since the hooks are mounted behind and above the head portion, the hooks will be spaced from any obstructions so as to tend to prevent entanglement therewith, a feature which also applies to surface and mid-depth operation. The arrangement is such that the lure may be "walked", i.e., moved very slowly across the bottom, over logs, into and out of holes, etc. much in the manner of a feeding fish or eel.

Figure 16:
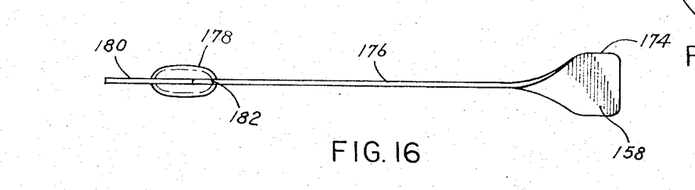
FIG. 16 is a top view of an alternative embodiment of a non-floating lure incorporating the inventive concepts.
Figure 18:
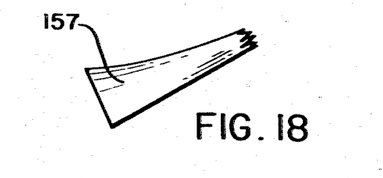
Figure 19:
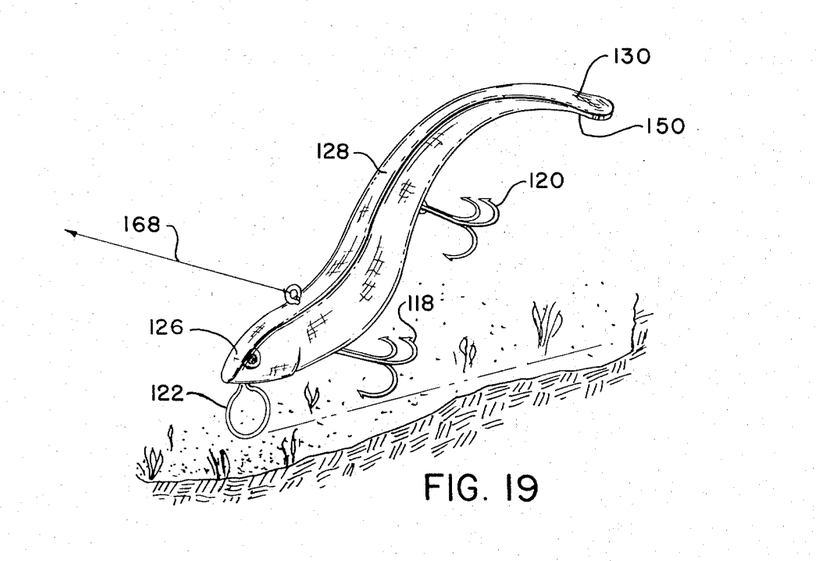
FIG. 19 is another perspective view of the lure of FIG. 9 in a bottom fishing position.

In the alternative non-flotation embodiment of FIG. 16, the body member has the same general configuration in side elevation as the flotation lure of FIGS. 9-15 and comprises a flat piece of sheet metal with the tail portion 174 twisted 90° relative to the central body portion 176 to provide the reaction surface 158. A weight 178 is suitably attached to the head portion 180 and a line attaching hole 182 may be cut in the sheet metal adjacent the top edge of the head portion. While the lure of FIG. 16 does not utilize the flotation concept of the lure of FIGS. 9-15, it will have some of the same action when pulled through water.

In operation, with a fishing line attached to eyelet 124, the line of pull will be generally as indicated at 168 and the pulling force will be applied at 172 where the line is more or less pivotally connected to the lure. When the lure is at rest or being pulled through water, the wieghted head portion will be located at a lower elevation (depth) than the tail portion. Since the head portion and the center of gravity of the lure are located beneath the line of pull, the lure tends to turn about the axis 170 with the head portion moving to one side of the line of pull and the tail portion moving to the other side of the line of pull. Water pressure acting on one or the other of the side surface sections of the nose portion will cause the lure to turn and tilt about point 172. As the tail portion moves to the other side of the line of pull, more of the area of the reaction surface 150 on the tail portion is located on the other side of the line of pull and less of the area of the reaction surface is located on the one side of the line of pull. In addition to the pivotal movement of the lure about the generally vertical pivotal axis 170 in FIG. 9, the lure also tilts about the point 172 whereby the coplanar central longitudinal lure axes 132, 134, 136 shift from a generally vertical attitude to an inclination of up to approximately 30° which may be referred to as tilting movement of the lure. In the maximum turned and tilted position, the force of the water acting on the reaction surface 150 causes a change in direction of movement of the lure about point 172 and moves the lure in the opposite direction whereupon the effect of the momentum of the lead weight and the force of the water acting on one side or the other of the head portion will move the lure to an oppositely located position. The result is that the turning force on the head of the lure caused by the pulling movement is eventually overcome by an opposite turning force on the tail of the lure caused by water pressure acting on the reaction surface 150 which is effective to return the lure toward the central position. The momentum of the weighted nose portion will carry the nose portion past the central position to turn and tilt the lure in the opposite direction until the water pressure acting on the rear reaction surface again changes the direction of movement of the lure. Thus, the lure action is that of rapid side to side movement which gives the impression that the lure is self-propelled. The side to side movement of the lure is hereinafter referred to as pivotal swinging movement whether caused by turning or tilting or a combination thereof. While the exact movements of the lure may not be completely known and the exact reasons for the movement may not be completely understood, the foregoing description is believed to be sufficient to enable those skilled in the art to practice the invention.

Since the inventive principles may be otherwise variously embodied, it is intended that the appended claims be construed to include alternative embodiments except insofar as limited by the prior art.

I claim:

1. An artificial fishing lure adapted to be attached to a fishing lure and pulled through water thereby in a fishing position and comprising:

an elongated lure body having, in the fishing position, a front end, a rear end, and upper, lower and side surfaces defining a fish-like peripheral configuration including a head portion at the front end, a tail portion at the rear end and an intermediate body portion extending therebetween, the upper and lower surfaces of said body portion being upwardly curved relative to said head portion and said tail portion to define a flow channel beneath said body portion between said head portion and said tail portion, a waist-like section on said lure body of reduced width relative to and connecting said body portion to said tail portion and directing water flowing over said body portion onto said tail portion, a fishing line attachment means fixed to said lure body along the upper surface thereof adjacent said head portion and located rearwardly of the front end of the lure body and providing a pivotal point of attachment for a fishing line and a point of application of a pulling force located rearwardly above the front end of the lure body, weight and flotation means on said lure body to cause said lure body to float in the water with said head portion located at a lower elevation than said tail portion whereby, in the fishing position, said head portion being at a first depth in the water and said tail portion extends generally horizontally at a second lesser depth in the water than the first depth, and the intermediate portion of said body between said head portion and said tail portion extends upwardly and rearwardly relative to said head portion, front reaction surface means on said head portion located forwardly and downwardly of the point of application of the pulling force for engagement with flowing water to initiate a first turning movement to cause the lure body to turn in the water to one side and alternately to the other side of a vertical plane including the point of application of the pulling force, and generally forwardly facing rear reaction surface means on said tail portion, extending generally in a plane transverse to a plane including the longitudinal axis of the lure body and the point of application of the pulling force, for engagement with water flowing around the lure body as the lure body is turned in the one direction and alternately in the other direction by the force of the water acting on said front reaction surface means to stop the first turning movement and to initiate a second turning movement in the opposite direction to cause the lure to turn in the water to the other side and alternately to the one side of a vertical plane including the point of application of the pulling force whereby the lure body repetitively uniformly and controllably turns from side to side as it moves through the water.

2. The invention as defined in claim 1 and wherein said upper and lower surfaces of said lure body are horizontally elongated and correspond to the side surfaces of a fish whereby said lure body gives the appearance of a wounded fish in the water.

3. The invention as defined in claim 1 and wherein said lure body has an eel type fish-like appearance, said upper and lower surfaces corresponding to the top and bottom surfaces of an eel, and said side surfaces being vertically elongated.

4. The invention as defined in claim 1 and wherein said weight and flotation means comprising an air tight chamber in the body portion of said lure body.

5. The invention as defined in claim 4 and wherein said weight and flotation means further comprising a lead-like member located in the nose portion in front of the point of application of the pulling force.

6. The invention as defined in claim 1 and wherein said lure body is made of two halves of a molded plastic material, there being an air tight chamber within said lure body extending the length of said body portion.

7. The invention as defined in claim 1 and having means for operatively securing at least one fish hook means to the lower surface of said body.

8. The invention as defined in claim 7 comprising a front fishhook means adjacent said head portion and a second fishhook means adjacent said tail portion.

9. The invention as defined in claim 1 wherein one of said upper and lower surfaces is of a convex configuration and the other is of a concave configuration, said weight and flotation means being such as to cause the lure to float on the surface of the water when at rest and to move beneath the surface of the water when rapidly pulled therethrough, the configuration of the lure being such as to cause the lure to float upwardly and rearwardly from beneath the surface when pulling ceases.

10. An artificial fishing lure adapted to be attached to a fishing line and pulled through the water thereby, comprising:

an elongated member, a head portion at one end of said body member, a tail portion at the other end of said body member, an intermediate portion extending between said head portion and said tail portion, weight means on said lure to hold said head portion below said tail portion in water whereby, in the fishing position, said head portion being at a first depth in the water and said tail portion extends generally horizontally at a second lesser depth in the water than the first depth, and the intermediate portion of said body between said head portion and said tail portion extends upwardly and rearwardly relative to said head portion, line attachment means on said body member adjacent said head portion to provide a line of pull above the center of gravity of said lure and behind the one end of said body member so that water pressure acting on said head portion causes side swinging movement of said lure as it moves through water, and said tail portion having reaction surface means extending generally transversely to the line of pull whereby during movement through water alternate opposite turning forces are exerted on said lure to cause the lure to turn uniformly repetitively from side to side.

11. The invention as defined in claim 10 and wherein said reaction surface means extends generally transversely from side to side of said body member and faces downwardly and forwardly.

12. The invention as defined in claim 11 and wherein said reaction surface means extends transversely beyond the sides of said body member.

13. The invention as defined in claim 10 and having flotation means in said body member to cause said lure to float in water.

14. The invention as defined in claim 13 and wherein said flotation means comprises an air space within said body member.

15. The invention as defined in claim 14 and wherein said body member is made from a molded plastic material.

16. An artificial fishing lure adapted to be attached to a fishing line to be pulled through water thereby comprising:
an elongated body member having
a nose portion,
a tail portion, and
an inclined central connection portion extending therebetween and locating said tail portion in rearwardly offset relationship to said nose portion;
weight means on said body member to cause said nose portion to be located at a different depth than said tail portion whereby, in the fishing position, said head portion being at a first depth in the water and said tail portion extends generally horizontally at a second lesser depth in the water than the first depth, and the intermediate portion of said body between said head portion and said tail portion extends upwardly and rearwardly relative to said head portion,
line attachment means on said body member adjacent said nose portion to establish a line of pull offset from the center of gravity of said body member and to cause a first turning force to be exerted on said nose portion by water pressure as the lure is pulled through water, and
reaction surface means on said tail portion facing the general direction of water flow as the lure is pulled through water and being engageable by flowing water to cause a second opposite turning force to be exerted on said body member by water pressure as the lure is pulled through the water,
the combined effect of said first and second turning forces being controlled repetitive swinging movement of said tail portion from side to side about a point on said line attachment means as said lure is pulled through water.

17. An artificial fishing lure adapted to be attached to a fishing line and pulled through water in a particular fishing position and to attract fish by its movement through water and comprising:
an elongated body having a generally fish-like peripheral configuration with top, bottom and side surfaces and front and rear ends in the fishing position,
a tail portion at the rear end of said lure,
a head portion at the front end of said lure,
an intermediate portion of the lure extending between siad head portion and said tail portion,
weight and flotation means in said lure locating the center of gravity of the lure adjacent said head portion to cause said lure to float in the water at a predetermined depth with said head portion located below said tail portion, whereby in the fishing position, said head portion being at a first depth in the water and said tail portion extending generally horizontally at a second lesser depth in the water than said first depth, and the intermediate portion of said body between said head portion and said tail portion extending upwardly and rearwardly relative to said head portion,
line attachment means adjacent said head portion and located above and adjacent the center of gravity for attachment of a line to the lure at a point whereat a line of pull is established above said center of gravity and said head portion and below said tail portion in the fishing position so as to cause said lure to turn about said point in a first direction as it is pulled through water,
hook means on said body arranged to be located rearwardly of said head portion in the fishing position, and
reaction surface means on said tail portion engageable by flowing water and movable by water pressure thereagainst as said lure is pulled through the water so as to terminate turning movement of said lure in said first direction and to cause said lure to turn about said point in an opposite direction to said first direction, to effect a uniform repetitive side to side turning movement as the lure is pulled through the water.

18. The invention as defined in claim 17 and wherein said turning movement of said lure comprises pivotal movement and tilting movement about said point.

19. The invention as defined in claim 18 and wherein said reaction surface means comprises a generally flat downwardly and forwardly facing surface.

20. The invention as defined in claim 19 and wherein said reaction surface means extends beyond both of said side surfaces of said body of said lure.

21. An artificial fishing lure adapted to be attached to a fishing line to be pulled through water thereby comprising:
an elongated body member having
a nose portion,
a tail portion, and
an inclined central connection portion extending therebetween and locating said tail portion in rearwardly offset relationship to said nose portion;
a weight member mounted on said body member adjacent said nose portion to cause said nose portion to be located at a different depth than said tail portion,
line attachment means on said body member adjacent said nose portion to establish a line of pull offset from the center of gravity of said body member and to cause a first turning force to be exerted on said nose portion by water pressure as the lure is pulled through water,
said line attachment means being located in vertically offset relationship to said weight member to cause the weight member to be moved about and to one side of said line of pull and thereby turn and tilt said tail portion to the other side of said line of pull, and reaction surface means on said tail portion facing the general direction of water flow as the lure is pulled through water and being engageable by flowing water to cause a second opposite turning force to be exerted on said body member by water pressure as the lure is pulled through the water, said reaction surface means being effective by water pressure thereagainst to move said tail portion from the other side of the line of pull to the one side of said line of pull and to move said weight member from the one side of the line of pull to the other side of said line of pull, the combined effect of said first and second turning forces and said weight member and said reaction surface means being controlled repetitive swinging movement of said tail portion from side to side about a point on said line attachment means to rapidly oscillate the lure from side to side of the line of pull as said lure is pulled through water.

22. An artificial fishing lure adapted to be attached to a fishing line to be pulled through water thereby comprising:

an elongated body member having
a nose portion,
a tail portion, and
an inclined central connection portion extending therebetween and locating said tail portion in rearwardly offset relationship to said nose portion;
weight means on said body member to cause said nose portion to be located at a different depth than said tail portion, line attachment means on said body member adjacent said nose portion to establish a line of pull offset from the center of gravity of said body member and to cause a first turning force to be exerted on said nose portion by water pressure as the lure is pulled through water, reaction surface means on said tail portion facing the general direction of water flow as the lure is pulled through water and being engageable by flowing water to cause a second opposite turning force to be exerted on said body member by water pressure as the lure is pulled through the water, the combined effect of said first and second turning forces being controlled repetitive swinging movement of said tail portion from side to side about a point on said line attachment means as said lure is pulled through water, and a narrow width guide element extending downwardly and forwardly of said nose portion to guide said lure along and in spaced relationship to surfaces encountered in the water.

23. The invention as defined in claim 22 and wherein said guide element comprises a loop of wire.

24. The invention as defined in claim 22 and wherein said weight member is sufficiently heavy to locate the lure at the bottom of the water with only said guide element supporting the lure on the bottom of the water.

* * * * *